(12) United States Patent
Kim

(10) Patent No.: US 9,163,592 B2
(45) Date of Patent: Oct. 20, 2015

(54) VAPOR GAS DISCHARGING APPARATUS FOR HYBRID ELECTRIC VEHICLE

(75) Inventor: Changhyun Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 786 days.

(21) Appl. No.: 13/455,884

(22) Filed: Apr. 25, 2012

(65) Prior Publication Data

US 2013/0146031 A1    Jun. 13, 2013

(30) Foreign Application Priority Data

Dec. 9, 2011  (KR) .................. 10-2011-0131739

(51) Int. Cl.
| | | |
|---|---|---|
| *F02M 25/08* | (2006.01) | |
| *F02D 29/02* | (2006.01) | |
| *B60W 20/00* | (2006.01) | |
| *B60W 10/08* | (2006.01) | |
| *B60K 15/035* | (2006.01) | |

(52) U.S. Cl.
CPC ........ *F02M 25/089* (2013.01); *B60K 15/03504* (2013.01); *B60W 10/08* (2013.01); *B60W 20/1086* (2013.01); *F02D 29/02* (2013.01); *B60K 2015/03514* (2013.01); *F02M 2025/0881* (2013.01)

(58) Field of Classification Search
CPC .......... F02M 25/0854; F02M 25/0872; F02M 25/089; F02M 2025/0881
See application file for complete search history.

(56) References Cited

U.S. PATENT DOCUMENTS

| | | | | |
|---|---|---|---|---|
| 3,645,098 A | * | 2/1972 | Templin et al. | 60/288 |
| 4,368,711 A | * | 1/1983 | Allen | 123/522 |
| 4,846,135 A | * | 7/1989 | Tiphaine | 123/520 |
| 5,021,071 A | * | 6/1991 | Reddy | 95/106 |
| 5,207,734 A | * | 5/1993 | Day et al. | 60/278 |
| 5,273,020 A | * | 12/1993 | Hayami | 123/520 |
| 5,388,558 A | * | 2/1995 | Plapp et al. | 123/520 |
| 5,845,485 A | * | 12/1998 | Murphy et al. | 60/274 |
| 6,122,908 A | * | 9/2000 | Wirmark | 60/274 |
| 6,526,950 B2 | * | 3/2003 | Ito et al. | 123/518 |
| 7,036,489 B1 | * | 5/2006 | Wu et al. | 123/519 |

(Continued)

FOREIGN PATENT DOCUMENTS

| | | |
|---|---|---|
| JP | 10-121949 A | 5/1998 |
| JP | 2001-295708 A | 10/2001 |

(Continued)

*Primary Examiner* — Hieu T Vo
*Assistant Examiner* — Sherman Manley
(74) *Attorney, Agent, or Firm* — Morgan, Lewis & Bockius LLP

(57) ABSTRACT

A vapor gas discharging apparatus for a hybrid electric vehicle (HEV), which includes a vapor line disposed between a canister and a fuel tank, wherein a purge line may be connected to the canister for transferring vapor gas from the canister to an engine, may include a discharging nipple formed to the canister and employed to supply air to the canister, an air supply line connected to the discharging nipple of the canister for supplying the air to the discharging nipple, a two-way valve connected to an end of an exhaust pipe and an end of the air supply line, and controlled for selectively communicating air flow between the air supply line and the exhaust pipe or between the air supply line and the outside of the air supply line, and a conduction member disposed in the air supply line between the two-way valve and the discharging nipple.

5 Claims, 7 Drawing Sheets

(56) References Cited

U.S. PATENT DOCUMENTS

| | | | |
|---|---|---|---|
| 7,114,492 B2* | 10/2006 | Reddy | 123/518 |
| 7,331,334 B2* | 2/2008 | Leone et al. | 123/516 |
| 7,444,996 B2* | 11/2008 | Potier | 123/519 |
| 7,527,045 B2* | 5/2009 | Chung | 123/519 |
| 8,261,531 B2* | 9/2012 | Gandhi et al. | 60/283 |
| 2006/0065253 A1* | 3/2006 | Reddy | 123/520 |
| 2007/0251511 A1* | 11/2007 | Potier | 123/520 |
| 2013/0160746 A1* | 6/2013 | Woods et al. | 123/521 |

FOREIGN PATENT DOCUMENTS

| | | |
|---|---|---|
| KR | 10-2007-0060434 A | 6/2007 |
| KR | 10-2009-0109930 A | 10/2009 |
| KR | 10-2011-0044191 A | 4/2011 |
| WO | WO 98/04815 A1 | 2/1998 |

\* cited by examiner

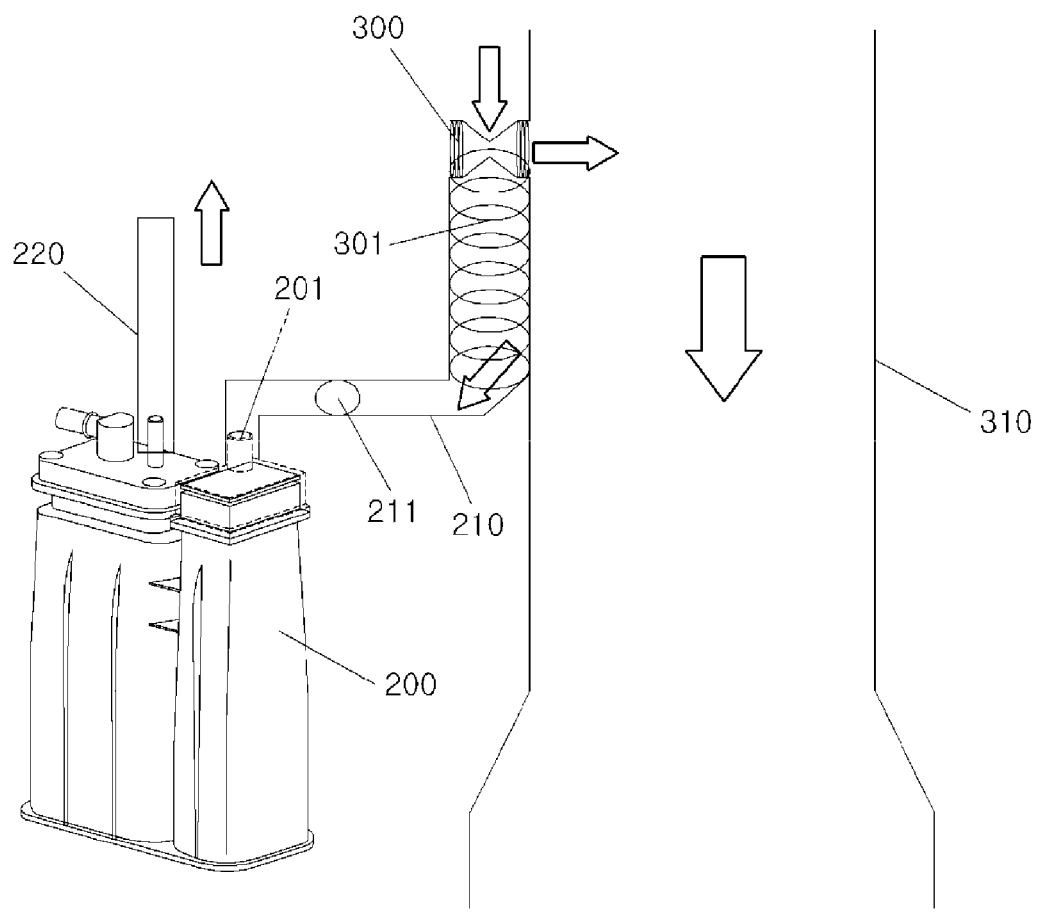

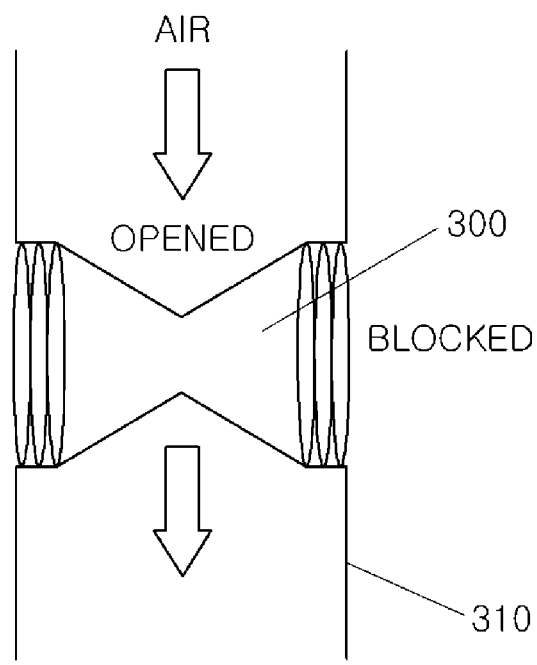

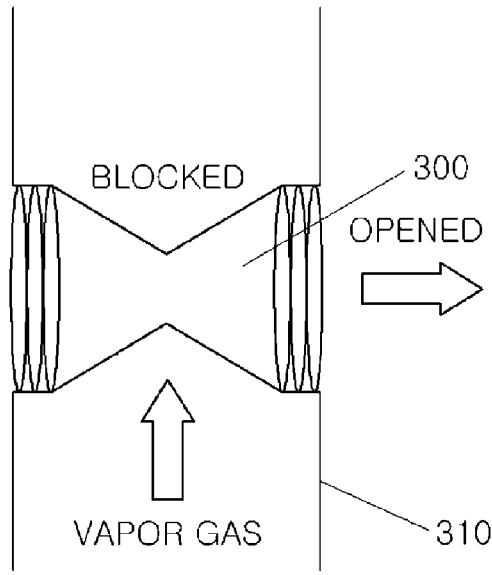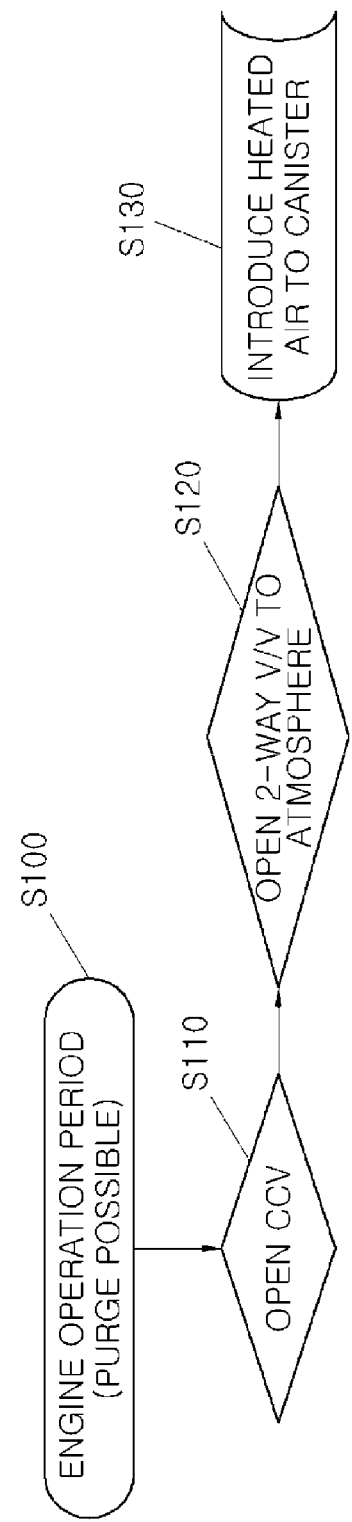

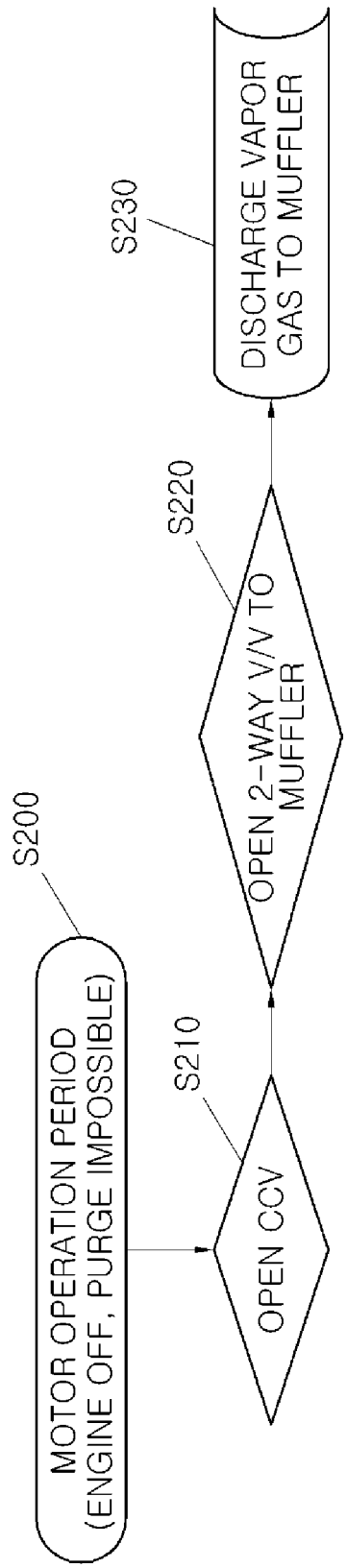

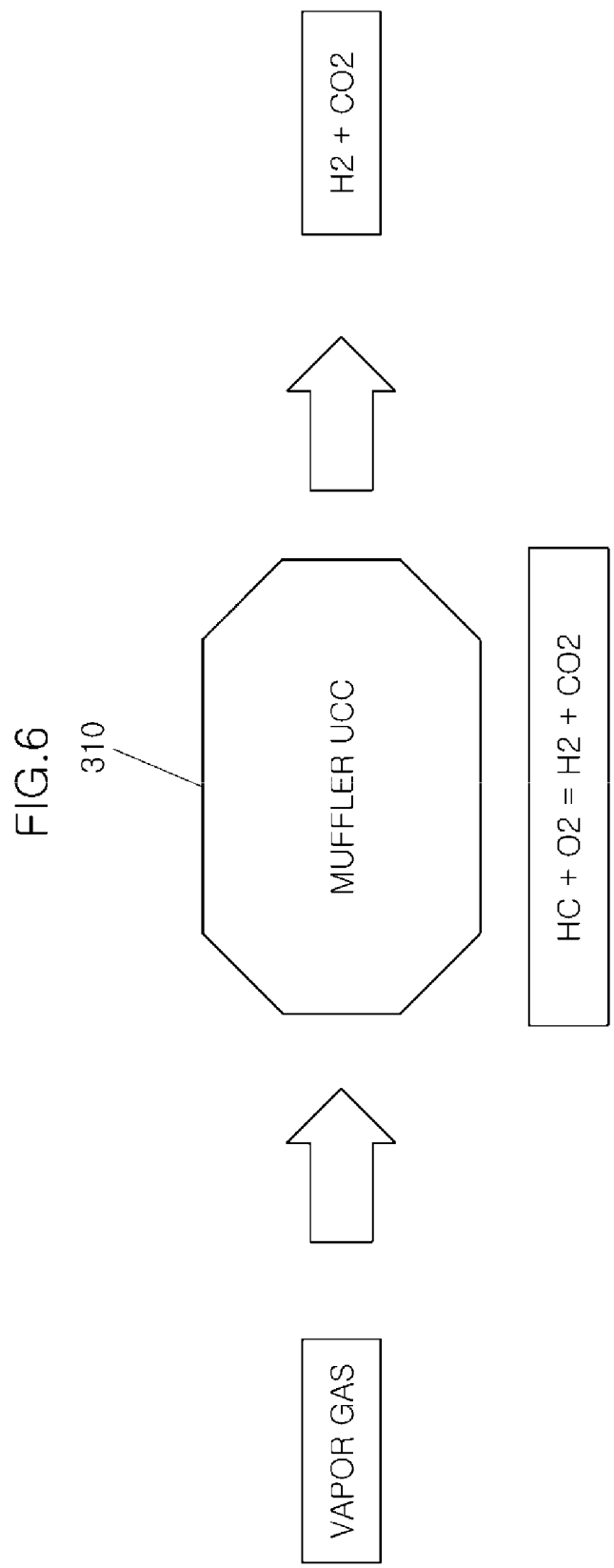

VAPOR GAS DISCHARGING APPARATUS FOR HYBRID ELECTRIC VEHICLE

CROSS-REFERENCE TO RELATED APPLICATIONS

The present application claims priority to Korean Patent Application Number 10-2011-0131739 filed Dec. 9, 2011, the entire contents of which application is incorporated herein for all purposes by this reference.

BACKGROUND OF THE INVENTION

1. Field of the Invention

The present invention relates to a vapor gas discharging apparatus for a hybrid electric vehicle (HEV), and more particularly, to a vapor gas discharging apparatus for an HEV, which is capable of stably discharging vapor gas inside a fuel tank during a motor operation period, even in a low-temperature environment.

2. Description of Related Art

In general, an important factor which is most considered in a fuel system when designing an HEV using an engine and a motor is how to discharge vapor gas, discharged from a fuel tank during an engine stop period, to the outside.

When the engine of the HEV is operated, vapor gas is transferred to the engine from a canister by a gasoline engine together with fuel.

That is, the HEV is driven by the motor in a middle/low-speed state and an idle state. At this time, since the engine is stopped, a purge rate of vapor gas introduced from the canister to the engine becomes zero. However, the fuel inside the fuel tank continuously discharges vapor gas. Therefore, when the vapor gas introduced into the canister from the fuel tank is not discharged to a purge line, the vapor gas is discharged to the atmosphere through an air outlet.

Therefore, the HEV may not meet the exhaust gas regulations, and may cause a problem in merchantability, such as smell.

In order to solve the above-described problem, a vapor gas discharging apparatus for an HEV has been proposed in the related art as illustrated in FIG. 1. The vapor gas discharging apparatus for an HEV includes a fuel tank 10 formed of a high-tension steel plate having such a large thickness as to endure excessive pressure of vapor gas, a vent valve 40 mounted on a vapor line 30 provided between fuel tank 10 and a canister 20, and a pressurized OBD valve 50 mounted at an outlet nipple 21 of canister 20.

In the vapor gas discharging apparatus for an HEV according to the related art, when there is no purge during a motor operation, a vapor gas flow is formed as follows.

In the vapor gas discharging apparatus for an HEV according to the related art, the engine is stopped during an idle or low-speed period, and vent valve 40 of vapor line 30 is blocked when the motor is operated. Accordingly, the vapor gas inside fuel tank 10 is not introduced into canister 20, but the vapor gas stays inside the fuel tank 10.

When the engine is operated during an acceleration period, vent valve 40 of vapor line 30 is opened. At this time, the vapor gas inside fuel tank 10 is introduced to canister 20 through vapor line 30, and then transferred to the engine along a purge line 60 connected to canister 20.

Meanwhile, the vapor gas discharging apparatus for an HEV according to the related art includes a heat storage material inside canister 20, in order to fundamentally prevent the vapor gas from being discharged to the atmosphere during the motor operation. Such a heat storage material repeats liquid/solid phase changes at a predetermined temperature, and emits latent heat during the phase change from liquid to solid. That is, hexadecane used as the heat storage material causes phase change at a reference temperature (about 18° C.) of the room temperature regulation. The latent heat generated at this time increases the internal temperature of canister 20, thereby increasing the desorption efficiency of activated carbon for collecting the vapor gas.

However, the production cost and weight of the vapor gas discharging apparatus may rise due to the heat storage material and the structure thereof, and the heat storage material may obtain an effect of the phase change only at the reference temperature. Therefore, the heat storage material does not have an effect upon an efficiency increase of canister 20 at a low temperature. Accordingly, there are difficulties in operating the vapor gas discharging apparatus in cold places and during the winter season.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a vapor gas discharging apparatus for an HEV, which is capable of effectively discharging vapor gas inside a fuel tank during a motor operation period.

In an aspect of the present invention, a vapor gas discharging apparatus for a hybrid electric vehicle (HEV), which may include a vapor line disposed between a canister and a fuel tank having a vent valve connected to the vapor line, so as to transfer vapor gas therebetween, wherein a purge line is connected to the canister for transferring vapor gas from the canister to an engine, may include a discharging nipple formed to the canister and employed to supply air to the canister, an air supply line connected to the discharging nipple of the canister for supplying the air to the discharging nipple, a two-way valve connected to an end of an exhaust pipe and an end of the air supply line, and controlled for selectively communicating air flow between the air supply line and the exhaust pipe or between the air supply line and the outside of the air supply line, and a conduction member disposed in the air supply line between the two-way valve and the discharging nipple.

The conduction member is formed as a coil shape.

An outer circumference of the air supply line is attached to an outer circumference of the exhaust pipe.

The air supply line may include a canister closed valve (CCV) installed in a downstream side of the conduction member and controlled for blocking or communicating an air flow through the air supply line.

While the engine of the vehicle is operated, the CCV is opened and the two-way valve communicates air into the air supply line and the discharging nipple, and simultaneously blocks air supply from the exhaust pipe, and while a motor of the vehicle is operated, the CCV is opened and the two-way valve communicates air of the air supply line to the exhaust pipe and simultaneously blocks air supply from the outside into the air supply line.

While the engine of the vehicle is operated, the two-way valve communicates air into the air supply line and the discharging nipple, and simultaneously blocks air supply from the exhaust pipe, and while a motor of the vehicle is operated, the two-way valve communicates air of the air supply line to the exhaust pipe and simultaneously blocks air supply from the outside into the air supply line.

In the vapor gas discharging apparatus for an HEV according to the exemplary embodiment of the present invention, during the motor operation period where the engine is turned off and purge is impossible, the vapor gas inside the canister is induced to the exhaust pipe, and discharged to the atmosphere through the catalyst. Therefore, the vapor gas may be stably discharged.

Further, during the engine operation period of the vehicle, the air heated by the conduction member is supplied to the canister, which makes it possible to increase the desorption efficiency of activated carbon even at a low temperature.

In addition, since a heat storage material and a structure thereof are omitted, the production cost and weight of the vapor gas discharging apparatus may be reduced.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3 schematically illustrates the connection relationship among an air supply line, a canister, and an exhaust pipe which are applied to the vapor gas discharging apparatus for an HEV according to the exemplary embodiment of the present invention.

FIGS. 4A and 4B illustrate the operation of a two-way valve applied to the vapor gas discharging apparatus for an HEV according to the exemplary embodiment of the present invention.

FIGS. 5A and 5B are flow charts showing the operation process of the vapor gas discharging apparatus for an HEV according to the exemplary embodiment of the present invention.

FIG. 6 shows a process in which vapor gas is decomposed by a catalyst of a muffler in the vapor gas discharging apparatus for an HEV according to the exemplary embodiment of the present invention.

Figure 1:
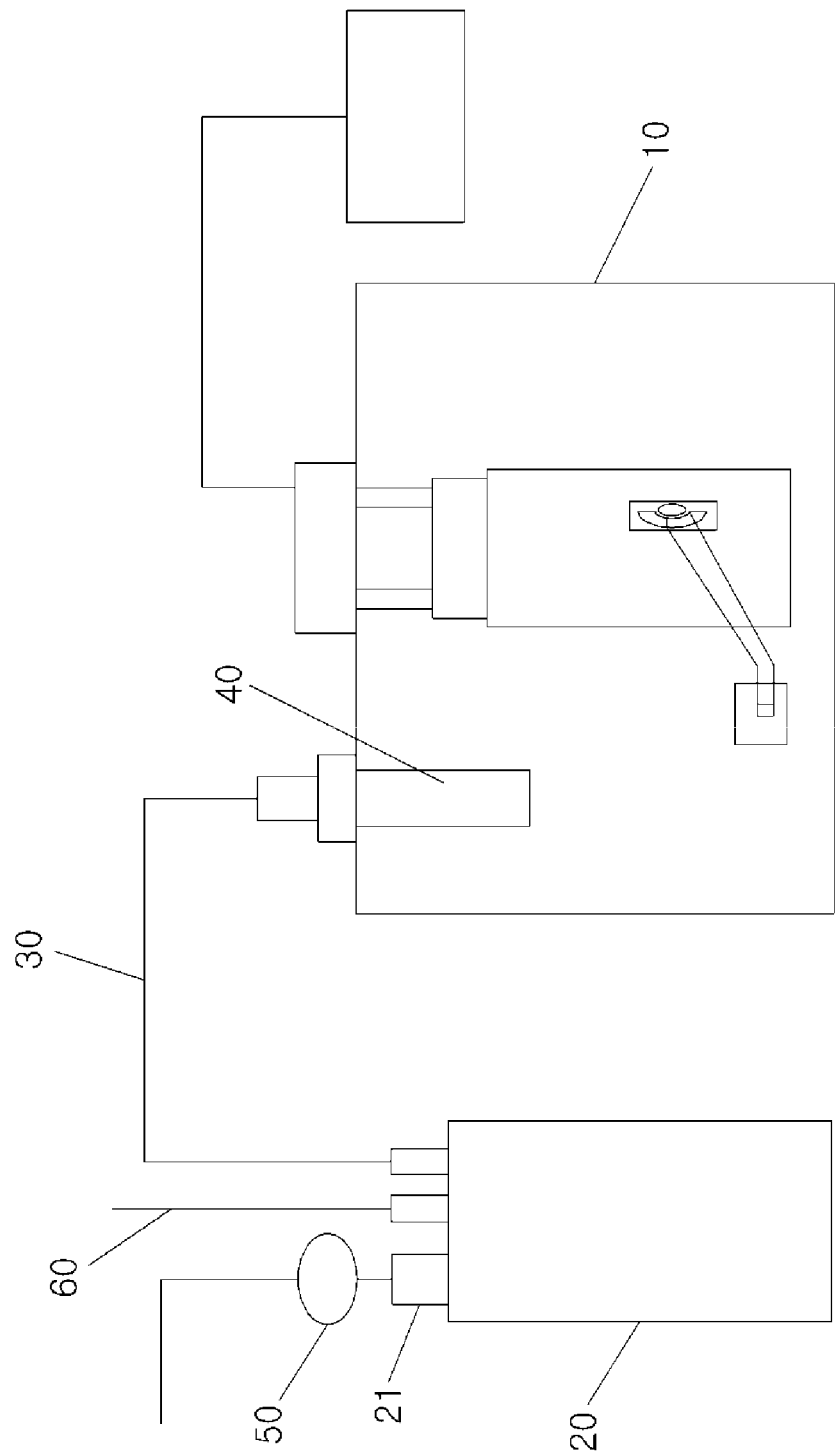
FIG. 1 schematically illustrates a vapor gas discharging structure for an HEV according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the exemplary embodiments of the present invention will be described in detail with reference to the accompanying drawings.

Figure 2:
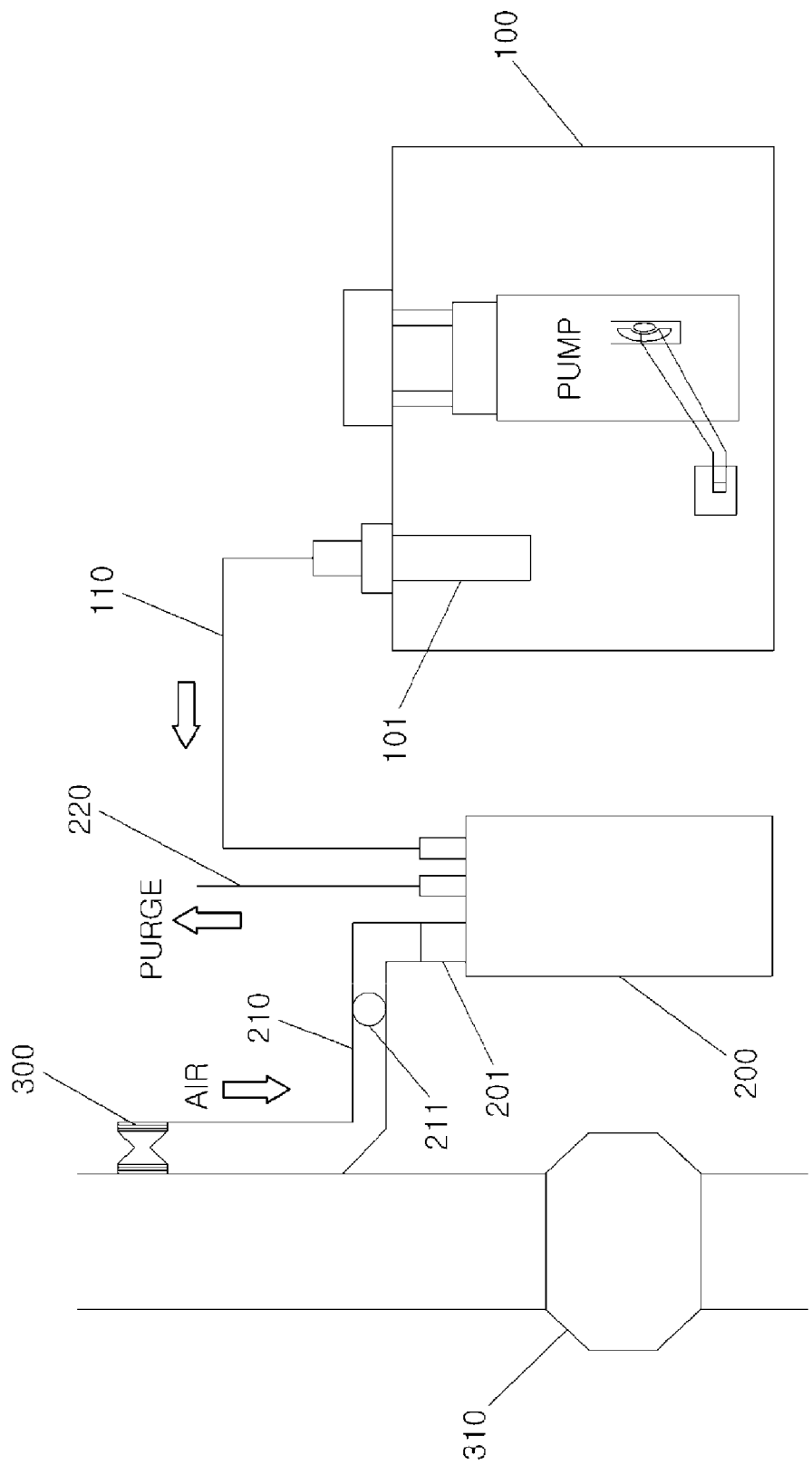
FIG. 2 schematically illustrates a vapor gas discharging apparatus for an HEV according to an exemplary embodiment of the present invention.

FIG. 2 schematically illustrates a vapor gas discharging apparatus for an HEV according to an exemplary embodiment of the present invention. FIG. 3 schematically illustrates the connection relationship among an air supply line, a canister, and an exhaust pipe which are applied to the vapor gas discharging apparatus for an HEV according to the exemplary embodiment of the present invention. As illustrated in FIGS. 2 and 3, the vapor gas discharging apparatus for an HEV according to the exemplary embodiment of the present invention includes a vapor line 110 provided between a canister 200 and a fuel tank 100 having a fuel pump and a vent valve 101 mounted therein and inducing vapor gas. Canister 200 is connected to a purge line 220 for transferring vapor gas to an engine.

Canister 200 includes a discharging nipple 201 formed to supply the air and communicating with an air supply line 210. Canister 200 is installed in such a manner that the outer circumference of air supply line 210 is closely attached to the outer circumference of an exhaust pipe 310 in which a catalyst is installed. Here, a conduction member 301 is installed inside air supply line 210 so as to transmit heat energy of exhaust pipe 310.

Therefore, air flowing through the inside of air supply line 210 is heated by heat exchange between conduction member 301 and exhaust pipe 310.

A two-way valve 300 is installed inside air supply line 210 so as to communicate with exhaust pipe 310. Two-way valve 300 may be installed in the upstream side of conduction member 301. Conduction member 301 may be formed in a coil shape along the longitudinal direction of air supply line 210 such that the heat transmission is easily performed.

FIGS. 4A and 4B illustrate the operation of the two-way valve applied to the vapor gas discharging apparatus for an HEV according to the exemplary embodiment of the present invention. As illustrated in FIG. 4A, two-way valve 300 may communicate the air flowing through the inside of air supply line 210 to discharging nipple 201 and simultaneously block the air from exhaust pipe 310. As illustrated in FIG. 4B, two-way valve 300 may communicate the air of air supply line 210 to exhaust pipe 310 and simultaneously block the air supply.

The above-described operation of the vapor gas discharging apparatus for an HEV according to the exemplary embodiment of the present invention will be described in more detail as follows.

FIGS. 5A and 5B are flow charts showing the operation process of the vapor gas discharging apparatus for an HEV according to the exemplary embodiment of the present invention. Referring to FIG. 5A, while the engine of the vehicle is operated (S100), that is, during an engine operation period where purge is possible, a canister closed valve (CCV) 211 is opened (S110).

Then, the air flowing through the inside of air supply line 210 is communicated to discharging nipple 210 and simultaneously blocked from exhaust pipe 310 by two-way valve 300 (S120).

Therefore, the air heated while passing through conduction member 301 is introduced into canister 200 (S130).

Meanwhile, referring to FIG. 5B, while the motor is operated (S200), that is, during a period where purge is impossible, the state where CCV 211 is opened is maintained (S210).

Then, the air of air supply line 210 is communicated to exhaust pipe 310 and the air supply is simultaneously blocked by two-way valve 300 (S220).

Therefore, the vapor gas remaining in canister 200 is discharged through exhaust pipe 300 (S230).

FIG. 6 shows a process in which vapor gas is decomposed by a catalyst of a muffler in the vapor gas discharging apparatus for an HEV according to the exemplary embodiment of the present invention. As shown in FIG. 6, the vapor gas of canister 200 is discharged to the atmosphere through the catalyst provided in exhaust pipe 310, while discharged through exhaust pipe 310. That is, the vapor gas containing hydrocarbon (HC) is separated into oxygen and carbon dioxide by a chemical reaction with oxygen in the catalyst and then discharged to the atmosphere. Therefore, environmental pollution does not occur ($HC+O_2=H_2+CO_2$).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vapor gas discharging apparatus for a hybrid electric vehicle (HEV), which includes a vapor line disposed between a canister and a fuel tank having a vent valve connected to the vapor line to transfer vapor gas therebetween, wherein a purge line is connected to the canister for transferring vapor gas from the canister to an engine, the vapor gas discharging apparatus comprising:
    a discharging nipple formed to the canister and employed to supply air to the canister;
    an air supply line connected to the discharging nipple of the canister for supplying the air to the discharging nipple;
    a two-way valve connected to an end of an exhaust pipe and an end of the air supply line, and controlled for selectively communicating air flow between the air supply line and the exhaust pipe or between the air supply line and the outside of the air supply line; and
    a conduction member disposed in the air supply line between the two-way valve and the discharging nipple,
    wherein the conduction member is formed as a coil shape.

2. The vapor gas discharging apparatus as defined in claim 1, wherein an outer circumference of the air supply line is attached to an outer circumference of the exhaust pipe.

3. A vapor gas discharging apparatus for a hybrid electric vehicle (HEV), which includes a vapor line disposed between a canister and a fuel tank having a vent valve connected to the vapor line to transfer vapor gas therebetween, wherein a purge line is connected to the canister for transferring vapor gas from the canister to an engine, the vapor gas discharging apparatus comprising:
    a discharging nipple formed to the canister and employed to supply air to the canister;
    an air supply line connected to the discharging nipple of the canister for supplying the air to the discharging nipple;
    a two-way valve connected to an end of an exhaust pipe and an end of the air supply line, and controlled for selectively communicating air flow between the air supply line and the exhaust pipe or between the air supply line and the outside of the air supply line; and
    a conduction member disposed in the air supply line between the two-way valve and the discharging nipple,
    wherein the air supply line includes a canister closed valve (CCV) installed in a downstream side of the conduction member and controlled for blocking or communicating an air flow through the air supply line.

4. The vapor gas discharging apparatus as defined in claim 3, wherein, while the engine of the vehicle is operated, the CCV is opened and the two-way valve communicates air into the air supply line and the discharging nipple, and simultaneously blocks air supply from the exhaust pipe, and while a motor of the vehicle is operated, the CCV is opened and the two-way valve communicates air of the air supply line to the exhaust pipe and simultaneously blocks air supply from the outside into the air supply line.

5. A vapor gas discharging apparatus for a hybrid electric vehicle (HEV), which includes a vapor line disposed between a canister and a fuel tank having a vent valve connected to the vapor line to transfer vapor gas therebetween, wherein a purge line is connected to the canister for transferring vapor gas from the canister to an engine, the vapor gas discharging apparatus comprising:
    a discharging nipple formed to the canister and employed to supply air to the canister;
    an air supply line connected to the discharging nipple of the canister for supplying the air to the discharging nipple;
    a two-way valve connected to an end of an exhaust pipe and an end of the air supply line, and controlled for selectively communicating air flow between the air supply line and the exhaust pipe or between the air supply line and the outside of the air supply line; and
    a conduction member disposed in the air supply line between the two-way valve and the discharging nipple,
    wherein while the engine of the vehicle is operated, the two-way valve communicates air into the air supply line and the discharging nipple, and simultaneously blocks air supply from the exhaust pipe, and while a motor of the vehicle is operated, the two-way valve communicates air of the air supply line to the exhaust pipe and simultaneously blocks air supply from the outside into the air supply line.

* * * * *